United States Patent
Beij et al.

(10) Patent No.: US 11,886,269 B2
(45) Date of Patent: Jan. 30, 2024

(54) CONTROL NETWORK SYSTEM FOR POWER ALLOCATION

(71) Applicant: SIGNIFY HOLDING B.V., Eindhoven (NL)

(72) Inventors: Marcel Beij, Sint Oedenrode (NL); Hermanus Johannes Maria Vos, Waalre (NL); Christian Tenhumberg, Vreden (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/637,083

(22) PCT Filed: Aug. 21, 2020

(86) PCT No.: PCT/EP2020/073523
§ 371 (c)(1),
(2) Date: Feb. 22, 2022

(87) PCT Pub. No.: WO2021/037739
PCT Pub. Date: Mar. 4, 2021

(65) Prior Publication Data
US 2022/0283625 A1    Sep. 8, 2022

(30) Foreign Application Priority Data
Aug. 29, 2019   (EP) .................... 19194276

(51) Int. Cl.
*G06F 1/3234*    (2019.01)
*G06F 1/3206*    (2019.01)

(52) U.S. Cl.
CPC .......... *G06F 1/3253* (2013.01); *G06F 1/3206* (2013.01)

(58) Field of Classification Search
CPC ..... G06F 1/3206; G06F 1/3253; H04L 12/10; H04L 12/00; H05B 47/18
See application file for complete search history.

(56) References Cited

U.S. PATENT DOCUMENTS

| | | | |
|---|---|---|---|
| 8,054,598 B1 * | 11/2011 | Sadler | H02J 3/14 361/63 |
| 8,793,511 B1 * | 7/2014 | Bishara | H04L 12/10 713/320 |
| 10,045,428 B2 | 8/2018 | Wendt | |
| 2007/0110360 A1 * | 5/2007 | Stanford | H04L 12/10 385/14 |
| 2008/0114997 A1 * | 5/2008 | Chin | H04L 12/10 713/321 |

(Continued)

FOREIGN PATENT DOCUMENTS

| | | |
|---|---|---|
| WO | 2013128339 A2 | 9/2013 |
| WO | 2017001281 A1 | 1/2017 |

*Primary Examiner* — Vincent H Tran (57) ABSTRACT

Apparatus, methods and systems are disclosed related to negotiation mechanism among control devices (200, 200a, 200b, 200c, 200d) each having a dedicated hierarchy level configured to obtain DC current from the control network (100) with at least a power source (300, 300') on the network (100). The control device (200, 200a) with a higher dedicated hierarchy level may request another control device (200b, 200c, 200d) with a lower dedicated hierarchy level to release current for its use, when the available current at the power source (300, 300') is not sufficient.

15 Claims, 7 Drawing Sheets

(56) References Cited

U.S. PATENT DOCUMENTS

| | | | |
|---|---|---|---|
| 2008/0114998 A1* | 5/2008 | Ferentz | H04L 12/10 713/324 |
| 2011/0197081 A1 | 8/2011 | Dove | |
| 2012/0286770 A1 | 11/2012 | Schröder et al. | |
| 2013/0339760 A1* | 12/2013 | Zimmerman | H04L 12/10 713/300 |
| 2016/0191256 A1 | 6/2016 | Wendt et al. | |
| 2017/0031406 A1* | 2/2017 | Teeter | G06F 1/28 |
| 2017/0325320 A1 | 11/2017 | Wendt et al. | |
| 2018/0199416 A1 | 7/2018 | Cartrette et al. | |
| 2018/0278488 A1* | 9/2018 | Kutty | H04L 12/10 |
| 2020/0012326 A1* | 1/2020 | Steele | G01R 21/133 |

* cited by examiner

CONTROL NETWORK SYSTEM FOR POWER ALLOCATION

CROSS-REFERENCE TO PRIOR APPLICATIONS

This application is the U.S. National Phase application under 35 U.S.C. § 371 of International Application No. PCT/EP2020/073523, filed on Aug. 21, 2020, which claims the benefit of European Patent Application No. 19194276.2, filed on Aug. 29, 2019. These applications are hereby incorporated by reference herein.

FIELD OF THE INVENTION

The present invention is directed generally to a control network system, for example for lighting control. More particularly, various methods, apparatus, systems and computer-readable media are disclosed herein related to power negotiation among multiple devices on the network.

BACKGROUND OF THE INVENTION

Digital Addressable Lighting Interface (DALI) is a standard communication protocol and a network-based system for lighting control. DALI controls the communication flow between Lighting Drivers/Gears (DALI: Control Gears) and Lighting Controllers (DALI: Control Devices) that forms a DALI network. The DALI network shall be supplied by a power source. A DALI system is specified by the technical standards IEC 62386 and IEC 60929, as incorporated by reference.

To cater for the application needs of the Internet of Things (IoT), the DALI protocol is also evolving. The new DALI sensor-ready (SR) interface builds on the DALI architecture. It uses a digital interface to connect the node (sensor) and the SR driver. This interface provides power to the node and allows for digital two-way communication based on DALI-2. By integrating power supplies for sensors, energy metering and diagnostics inside the light fixture, rather than outside as previously, the SR interface simplifies luminaire design, manufacturing and installation. Furthermore, the DALI SR protocol also enriches a new generation of lighting applications by employing diversified sensing data in the lighting control system.

US2008114997 A1 relates to a system and method of dynamic power management is implemented, where power supply equipment (PSE) supplies power to powered requiring devices (PRDs). The system and method monitors the power consumed at each port by the PRDs. Based on this monitoring, the PSE dynamically determines the minimum power which can be allocated to each PRD, and so dynamically maximizes the available reserve power. The PSE maintains a queue or queues wherein PRDs are listed in order of a power allocation priority. When additional power is available, the PSE preferentially allocates power to a PRD or PRDs which have higher priority.

SUMMARY OF THE INVENTION

In view of the above, the present disclosure is directed to methods, apparatus, systems, computer program and computer-readable media for power negotiation between control devices. More particularly, various computer-readable media (transitory and non-transitory), methods, systems and apparatus are provided to facilitate a control device with the highest hierarchy level to obtain power from the network with the highest priority. In accordance with a first aspect of the invention a control device is provided.

The control device having a dedicated hierarchy level configured to obtain DC current from a power source on the control network, the control device comprises: a communication subsystem configured to send a first query to the power source regarding an amount of available current of the power source; receive a reply from the power source about the amount of available current; a controller configured to determine if the amount of available current of the power source is sufficient as compared to a required supply current of the control device; and wherein the communication subsystem is further configured to: send a command to a second control device having a dedicated hierarchy level lower than the control device, instructing the second control device to send a release request to the power source to release supply current allocated to the second control device, when the amount of available current of the power source is determined insufficient; and send a current request to the power source for the required supply current, when the amount of available current of the power source is determined sufficient or after confirming the command is executed by the second control device.

The query, reply, and command as disclosed in the first aspect are all messages, exchanged between a control device and another device on the network, such as a second control device or a power source, using a communication protocol as used within the control network.

In order to obtain DC current from the power source on the network, a control device first checks whether the amount of available current of the power source is sufficient or not, and the control device sends out the current request when the power source has sufficient current available. The query-before-request mechanism helps to reduce the chance of a potential breakdown of the system; in particular when power sources may be forced to have a reboot when it receives a request from a control device for an amount of DC current that exceeds the maximum available current at the power source.

The control device is also associated with a dedicated hierarchy level, which can be used to indicate the functionality and/or capabilities of the control device. A control device with more functionalities and/or capabilities is assigned to a higher hierarchy level.

Such association can be made during the manufacture of the device or alternatively or additionally can be (re)configured by the user. With each control device having such a dedicated hierarchy level, it is possible to supply a control device DC current in a prioritized approach. A control device with a higher hierarchy level can force the second control device with a lower hierarchy level to release current for its own use. Therefore, if the control device realizes that the available current at the power source is not sufficient, it can request the second control device with a lower hierarchy level to release current. After confirming the other control device executes the command to release allocated current, the control device can then send the current request to the power source for the required amount. Therefore, a control device with more advanced functionality and/or capabilities is arranged to have a higher priority in obtaining DC current from the network.

To confirm if the second control device executes the command to release its allocated current, the control device may overhear the release request sent by the second control device on the network. The control device may also try to verify that in an active way by sending another query to the power source after a certain time delay, leaving sufficient time for the second control device to carry out the command, which may be a predetermined time period, which is known by (bus/protocol) design or which is established experimentally.

Note that a basic DC current is delivered by the power source to a newly connected control device upon connection or supplied by an integrated battery from the newly connected control device itself, which allows the newly connected control device to stay on the network and potentially to negotiate for extra DC current to enable more (or complete) functionality of it. The basic current also enables the newly connected control device to broadcast its hierarchy level, or to overhear communication on the network in order to figure out the hierarchy levels of existing control devices on the network. The current negotiation mechanism disclosed in this invention is related to the procedure to request extra DC current from the power source on the network, apart from the initially assigned or supplied basic DC current.

In one example, the control network is a lighting control network. In a smart lighting control system, a sensor node, as an input device, can be incorporated in a control device on the network to offer autonomous and intuitive controls to the lights. The sensor can be a simple light sensor, a light sensor with presence detection, a multi-sensor with RF interface or GPS capability, a temperature sensor, or another sensor still. Given that more and more sensors may be connected to the same lighting fixture via one or more control devices, depending on the various placements, types, capabilities of the sensors, and the number of sensors incorporated in a single control device, the demand on supply current may differ greatly from one control device to another. On the other hand, all the devices on the control system can be hot-swappable, and the devices can be plugged into or un-plugged from the network at any time. Therefore, it is efficient to resolve the competition among multiple devices on obtaining DC current in such a negotiation-based approach, thereby reducing the risk of unexpected system breakdown due to a newly connected device.

In one embodiment, the controller is further configured to calculate a gap between the required supply current of the control device and the available current of the power source when the amount of available current of the power source is determined to be insufficient, and the communication subsystem is further configured to: send a second query to the second control device regarding an amount of supply current from the power source allocated to the second control device, before sending the command to the second control device; receive a second reply from the second control device about the amount of its allocated supply current; send the command to the second control device instructing the second control device to send a release request to the power source to release an amount of supply current that is not larger than the allocated supply current of the second control device but is at least the same as the gap calculated, when the amount of allocated supply current of the second control device is higher than the gap.

Advantageously, to make sure that the power source will have sufficient supply current after the second control device with a lower hierarchy level releases its allocated current, the control device may first query the second control device regarding its allocated current and make an assessment locally before sending the current request to the power source. In that sense, the chance that the system will collapse due to an unexpected reboot of the power source is further reduced.

By knowing exactly the allocated current of second control device with a lower hierarchy level, the control device may consider requesting the second control device to release only a part of its allocated current. And then, certain functionalities of the second control device may still remain. Or on the other hand, if the allocated current to the second control device is just slightly larger than the gap and the remaining current above the gap cannot supply even the most basic functionality of the second control device, the control device may prefer to request the second control device to release all its allocated current. Otherwise, the system may run the risk of creating a useless and isolated power island on an individual control device.

In another embodiment, the communication subsystem is further configured to: send at least one further query to at least one further control device having a dedicated hierarchy level lower than the control device, regarding an amount of supply current allocated to the at least one further control device when the amount of allocated supply current of the second control device is lower than the gap; receive at least one reply from the at least one further control device about the amount of its allocated supply current; and the controller is further configured to split the gap into at least two sub-portions when a total amount of supply current allocated to the second control device and to the at least one further control device is higher than the gap; and the communication subsystem is further configured to send commands to the second control device and the at least one further control device instructing them to send release requests to the power source to release an individual amount of supply current, which is at least the same as one sub-portion of the at least two sub-portions but not larger than the individual allocated supply current of either the second control device or the at least one further control device; send the current request to the power source for the required supply current, after confirming the commands are executed by the second control device and the at least one further control device respectively; and wherein the number of sub-portions is the same as the sum of the second and at least one further control device.

Given the fact that different control devices may have different demands on the supply current, it can also happen that the newly connected control device with a higher hierarchy level needs more DC current than the total of the remaining supply current at the power source and the allocated current to the second control device. Then the newly connected control device may query at least one further control device, such as a third or a fourth control device, which have a lower hierarchy level than the control device, regarding the amount of its allocated current. And then the newly connected control device may split the gap between the required DC current and the available current at the power source among the second control device and the at least one further control device, and ask those control devices with lower hierarchy levels to release an amount of current equal to an individual portion out of the gap. And hence, the re-allocation of the supply current is done in a collective way.

Advantageously, the more than one sub-portion is split from the gap calculated according to one of: actual supply currents of the second and the at least one further control device, amounts derived from dedicated hierarchy levels associated with the second and the at least one further control device, an individual maximum supply current to be released by the second and the at least one further control device; and wherein each one of the more than one sub-portion can be of a same or different amount.

The split of the calculated gap into more than one subportion can be derived with considerations on system optimization. For example, it can be simply divided in proportion to the actual allocated supply current of an individual control device. It can also be derived according to the dedicated hierarchy level. Assuming the importance to the entire system may be related to the functionality or capability of the control device, it is desirable to first grab current as much as possible from a control device with a lowest hierarchy, instead of equally redistributing the need or gap among the multiple control devices with lower and non-identical hierarchy levels. It can also happen that it is more beneficial for the entire system to supply as many control devices as possible by reserving the basic functionality and releasing current for the more advanced functionality, and in that sense, for each control device there is a minimum supply current to be reserved, or a maximum supply current to be released. Another possibility is that the newly connected control device with the highest hierarchy level may have a certain functionality or capability in overlapping with some of the other control devices with lower hierarchy levels. And then in that sense, the newly connected control device may replace those control devices by grabbing all the allocated current of those devices.

In accordance with a second aspect of the invention a power source is provided. The power source on a control network for supplying DC current to devices on the network, the power source comprises: a communication subsystem configured to monitor the network; a controller configured to register an amount of available current out of a maximum current of the power source; and wherein the communication subsystem is further configured to: send a reply with information about the amount of available current at the power source upon receipt of the query; the controller is further configured to: allocate a requested current of a current request upon receipt of the current request; release a to-be released current of a release request upon receipt of the release request; update the amount of available current in accordance with allocations and releases.

Given that the devices on the control network can be hot-swappable or they may have a mal-function, the overhead will be too high for the power source to track the current allocation in a very detailed manner, even if it is possible to do so. Therefore, the power source is only responsible to provide a high-level overview of the current allocation by doing a simple bookkeeping. Starting with a maximum current, the power source will update the amount of available current every time upon the receipt of a current request or a release request by subtracting or adding a requested amount. And upon a certain request, the power source will allocate or release current accordingly. Therefore, the administration effort at the power source is reduced.

Preferably, the power source is either a standalone bus power supply, or an integrated power supply coupled to a device on the control network, and, wherein the communication subsystem and the controller act on behalf of the device and the power supply.

Depending on the structure of the control network, the power source can be stand-alone or integrated to a device on the network. It may also be possible that there is more than one power source, stand-alone, integrated, or both, on the network. If a first power source does not have sufficient current available, the control device may query one by one the more than one power source regarding the available current in each of the power sources. It can also happen that with the total available currents from the more than one power source there is still a gap from the required current of the control device. The control device may further request at least a second control device with a hierarchy level lower than the control device to release current for its own use, as disclosed above.

In one embodiment, a control network system is provided. The control network system comprising at least a control device and a second control device of claim 1, and at least one power source of claim 5, and the control network system complies to a DALI sensor ready, DALI-SR, standard.

The DALI-SR standard specifies a digital interface to connect the node (sensor) and the SR driver, which provides power to the node and allows for digital two-way communication based on DALI-2. A DALI-SR system is specified by the technical standard IEC 62386, hereby incorporated by reference. A DALI-SR system comprises bus, control gears, control devices (including input device and application controller), and bus power supply. The control gears, control devices, and bus power supply are also called bus units. Bus units conforming to the standard shall use different types of messages for communication, including queries, instructions, and event messages. As compared to the terminologies used in this invention, command, current request, and release request are all belonging to the category of instructions in a DALI-SR system. With more detailed classification of the communication messages, the disclosed system and method can be adapted to other control network as well.

Although the invention is disclosed for the control devices, the same methods are also applicable to control gears, as long as the control gears are configured to obtain DC currents from the control network. The control devices can be application controllers, input devices, or DALI user interface (UI) device. More detailed examples for control devices can be push buttons, light sensors, color sensor, occupancy sensors, relative/absolute input devices, remote interfaces, or manual configuration devices. Similarly, control gears can be LED/LV halogen/Fluorescent/HID control gears, switches, incandescent dimmers, self-contained emergency control gears, or color control gears. In that sense, the power allocation will be among one or more control devices and one or more control gears. By associating each of the control devices and control gears a dedicated hierarchy level, the disclosed methods, apparatus, systems, and computer programs can be applied directly. Furthermore, the invention is also applicable to other control systems with hybrid of sensors, controllers, drivers, and actuators.

Another aspect of the invention is the method for a control device having a dedicated hierarchy level to obtain DC current from a power source on the control network, the method comprising the control device: sending a first query to the power source regarding an amount of available current of the power source; —receiving a reply from the power source about the amount of available current; determining if the amount of available current of the power source is sufficient as compared to a required supply current of the control device; sending a command to a second control device having a dedicated hierarchy level lower than the control device, instructing the second control device to send a release request to the power source to release supply current allocated to the second control device, when the amount of available current of the power source is determined insufficient; and sending a current request to the power source for the required supply current, when the amount of available current of the power source is determined sufficient or after confirming the command is executed by the second control device.

Advantageously, the method further comprising the following steps of the control device: calculating a gap between the required supply current of the control device and the available current of the power source when the amount of available current of the power source is determined to be insufficient; sending a second query to the second control device regarding an amount of supply current from the power source allocated to the second control device, before sending the command to the second control device; receiving a second reply from the second control device about the amount of its allocated supply current; sending the command to the second control device instructing the second control device to send a release request to the power source to release an amount of supply current that is not larger than the allocated supply current of the second control device but is at least the same as the gap calculated, when the amount of allocated supply current of the second control device is higher than the gap.

It is further disclosed that when the amount of allocated supply current of the second control device is lower than the gap, the method further comprising the following steps of the control device: sending at least one further query to at least one further control device having a dedicated hierarchy level lower than the control device, regarding an amount of supply current allocated to the at least one further control device when the amount of allocated supply current of the second control device is lower than the gap; —receiving at least one reply from the at least one further control device about the amount of its allocated supply current; splitting the gap into at least two sub-portions when a total amount of supply current allocated to the second control device and to the at least one further control device is higher than the gap; sending commands to the second control device and the at least one further control device instructing them to send release requests to the power source to release an individual amount of supply current, which is at least the same as one sub-portion of the at least two sub-portions but not larger than the individual allocated supply current of either the second control device or the at least one further control device; —sending the current request to the power source for the required supply current, after confirming the commands are executed by the second control device and the at least one further control device respectively; and wherein the number of sub-portions is the same as the sum of the second and at least one further control device.

In another embodiment, the method further comprising the following steps of the second control device or the at least one further control device: monitoring the network; replying to the control device about its allocated supply current upon receipt of the second or the further query; sending the release request to the power source to release the amount of supply current required to release upon receipt of the command.

Preferably, the second control device having a lower hierarchy level cooperates with the control device having a higher hierarchy level. The control device with the higher hierarchy level is acting as a master control device. And hence, the power negotiation procedure among multiple control devices is simplified by always leaving the decision to the control device with a higher hierarchy level, and the second control device or other control devices with lower hierarchy levels simply obey the commands from the master control device.

Advantageously, the method further comprising the following step of the second control device or the at least one further control device: replying to the control device about an individual maximum supply current to be released upon receipt of the second or the further query.

Upon the query from the control device about the allocated current, the second control device or the at least one further control device may also reply with an individual maximum supply current to be released. And thus, the second control device or the at least one further control device may be able to remain on the network by reserving a basic amount of supply current. Later on, depending on the status of other control devices, the second control device or the at least one further control device may have the chance to reclaim more current to recover their functionalities or capabilities.

It is further disclosed that when the total amount of supply current allocated to the second control device and to the at least one further control device is lower than the gap, the method further comprising the control device: sending another command to the power source to force a reboot of the power source.

Advantageously, the control device with the higher hierarchy level is configured to force a reboot of the power source when the total amount of supply current allocated to the second control device and to the at least one further control device is lower than the gap. Such situation can only happen when the control device with the higher hierarchy level tries to claim more than the maximum current of the power source. Therefore, it usually indicates a discrepancy between the real usage of DC current and the bookkeeping at the power source, which can happen when one or more devices are removed from the network without sending a release request to the power source, e.g. due to a network disconnection. Since the power source does not track the status of individual control device dynamically, it can be difficult for the power source to figure out the change of individual device's status. As a result, the simple bookkeeping may go wrong as the power source does not need to record the individual power allocated to control devices. A reboot at the power source will refresh the registration of the available current, leading to a new negotiation session. Therefore, the previously requested current by a device that is later on un-plugged or has a mal function will be released and become available again.

In another embodiment, the method further comprising the steps of the power source: monitoring the network; registering an amount of available current out of a maximum current of the power source; sending a reply with the information about the amount of available current upon receipt of a first query; allocating a requested current of a current request upon receipt of the current request; releasing a to-be released current of a release request upon receipt of the release request; updating the amount of available current in accordance with allocations and releases.

The invention may further be embodied in a computer program (product) comprising code means which, when the program is executed by a computer, cause the computer to carry out the method for the control device, the second control device or the at least one further control device, and the power source, as well as a computer-readable storage medium having stored thereon the computer program (product).

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

Figure 1:
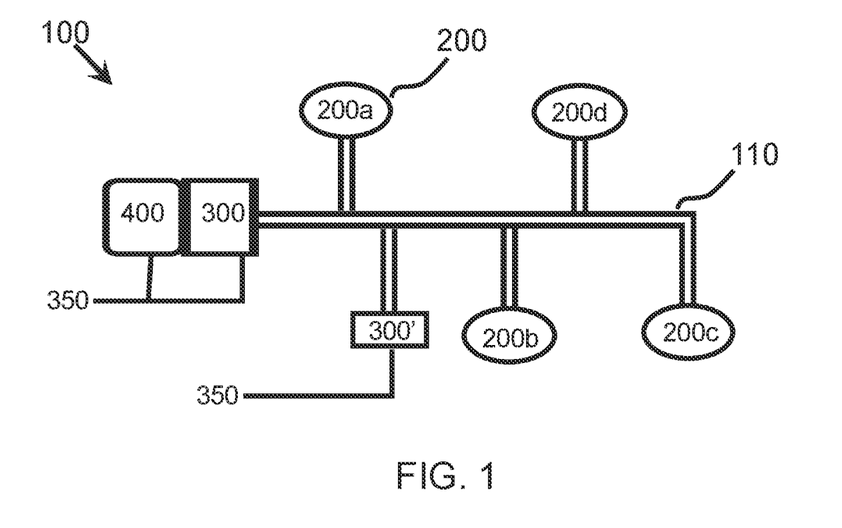
FIG. 1 shows a control network system with multiple control devices, a control gear, power supply and mains.

Various embodiments of the present invention will now be described based on a control network system 100 as shown in FIG. 1 with at least one control device 200a, 200b, 200c, 200d, an integrated power source 300 coupled to a device 400 (which can be a control gear) and mains 350 connected to the device 400, and a standalone power source 300' and mains 350 connected to it. Since different control devices may be deployed in different locations in the system and may connect to different sensors and actuators, different demands on DC currents and different functionalities and capabilities may be created thereafter. Since all the control devices may be hot swappable and can be connected to, or removed from, the control network, such as a DALI network, at any time. Thus, applicants have recognized and appreciated that it would be beneficial to implement a current negotiation mechanism among multiple control devices, given the limited current supply on the network and the growing number of control devices connected to the network. The negotiation mechanism of the invention may also be advantageously applied to other systems with a centralized power supply, where multiple devices compete with one another for power from the centralized power supply. Although the examples presented herein are particular to a lighting context, similar approaches may be followed in other systems wherein power from a power supply is shared. For example, similar approaches might be followed for power allocation within a home automation setting, which may, but not necessarily include lighting devices. The concept if moreover not limited to an indoor setting but may also be applied to an outdoor setting. For example, the concept may also be used in an outdoor lighting network (OLN), where (more) power needs to be allocated to light posts having a higher priority, e.g. in the event of an accident when more illumination is required, or alternatively for other functions powered using the OLN, such as a communication infrastructure mounted on or at the OLN.

In view of the foregoing, various embodiments and implementations of the present invention are directed to enabling a current negotiation mechanism among multiple control devices in a control network system according to a dedicated hierarchy level associated to each individual control device.

FIG. 1 shows an overview of the control network system 100. This figure shows that more than one control devices 200, 200a, 200b, 200c, 200d can be connected to the system 100, likewise more than one power source 300, 300' can be connected. For the ease of illustration, it is assumed in the figure that the control device 200a is newly connected to the network and has a higher hierarchy level than all the other existing control devices 200b, 200c, 200d on the network.

Various embodiments of devices, methods, computer program and computer-readable media are disclosed to facilitate the newly connected control device 200a to obtain sufficient current from the dynamic and heterogenous network. The dynamic characteristic of the network may come from the fact that all the devices are hot swappable, and/or the network or part of the network may experience malfunctions and/or break down. The heterogenous feature of the network comes from the fact that quite different functionalities and capabilities may be supported by different control devices. It can be that one control device is connected to more input devices, sensors, or actuators, and such auxiliary devices expand the functionalities of the control device. Correspondingly, the control device may also have a higher demand on supply current. The dedicated hierarchy level for each control device is associated to the functionality and capability of the device, which is used to enable a hierarchy-based current negotiation system.

A hierarchy level indicates the functionalities and capabilities of a control device, which can be one of a classification number, a hierarchy index, a group index, and a category index. A hierarchy level can be assigned to the control device during manufactory, and it can also be assigned by a user during usage and be updated later in a different user scenario or with a different configuration. In one example, the hierarchy level of a control device composes the information on the types of sensors or input devices coupled to it. In another example, the hierarchy level may indicate the processing capability of the device. Therefore, a higher hierarchy level also indicates a more powerful and/or capable control device, which deserves priority in obtaining power from the network.

Figure 2:
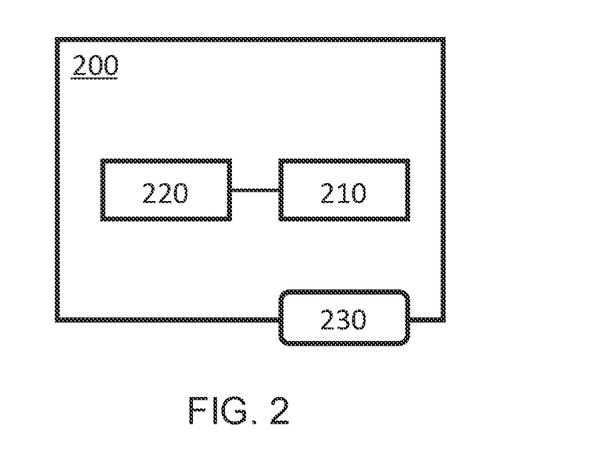
FIG. 2 schematically depicts example components of a control device.

FIG. 2 schematically depicts example components of a control device. As a very basic setup shown in the figure, the control device 200 comprises a communication subsystem 210, a controller 220, and an interface 230 to connect to the control network. The communication subsystem 210 may further include a transmitter and receiver pair, or an integrated transceiver. In case of a DALI network, the interface 230 is the physical interface connected to the DALI bus. As aforementioned, the control device may also be coupled with one or more sensors, or other input devices, which can provide data to the control device to allow it to carry out certain control functionalities autonomously. The control device may also include a memory to store sensor data or control signals.

Figure 3:
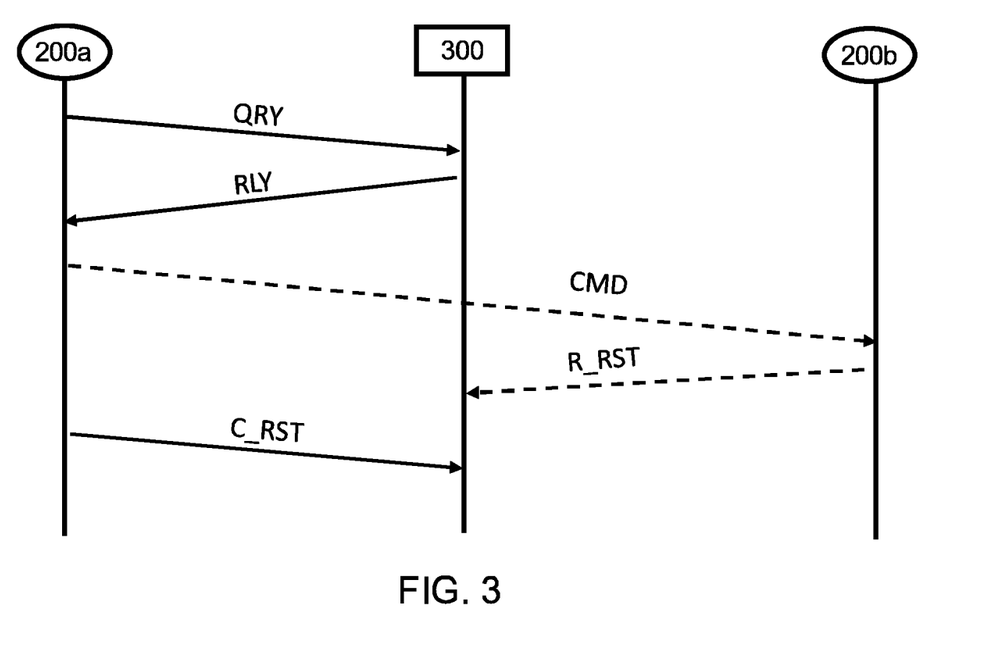
FIG. 3 illustrates a message exchange procedure for current negotiation between a control device, a power source, and a second control device.

Now with reference to FIG. 3, for a newly connected control device 200a configured to obtain DC current from the control network, the communication subsystem 210 is configured to send a query QRY to a power source 300 regarding the available current at the power source. And the communication subsystem 210 waits for the reply RLY from the power source about the amount of available current. In this way, the control device 200a can make the assessment locally whether or not the remaining current at the power source is sufficient or not. If the power source has sufficient current budget available, the control device 200a sends a current request to the power source directly to request the current it needs; otherwise, the control device 200a will send a command CMD to a second control device 200b having a dedicated hierarchy level lower than the control device 200a to release its allocated supply current. And then, after confirming the release request R_RST is sent by the second control device, the control device sends the current request C_RST to the power source 300. By overhearing the communication on the control network, such as the R_RST message sent from the second control device 200b to the power source 300, the control device 200a confirms if the second control device actually executes the command to release its allocated current. Not shown in the figure, the control device 200a may also try to verify that in an active way by sending another query to the power source after a certain time delay, leaving sufficient time for the second control device to carry out the command, which may be a predetermined time period that is known by (bus/protocol) design or which is established experimentally.

The query-before-request approach reduces the chance of an unpredicted reboot of a power source due to an unexpected request asking for more current than what is available at the power source. To give a priority to a control device with a higher hierarchy level in obtaining DC current, the control device can force a second control device with a lower hierarchy level to release current for its own use. Therefore, the current allocation is no longer based on a first-come-first-service principle, but based on the hierarchy level, or equivalently based on the functionalities and capabilities of the control devices.

Figure 4:
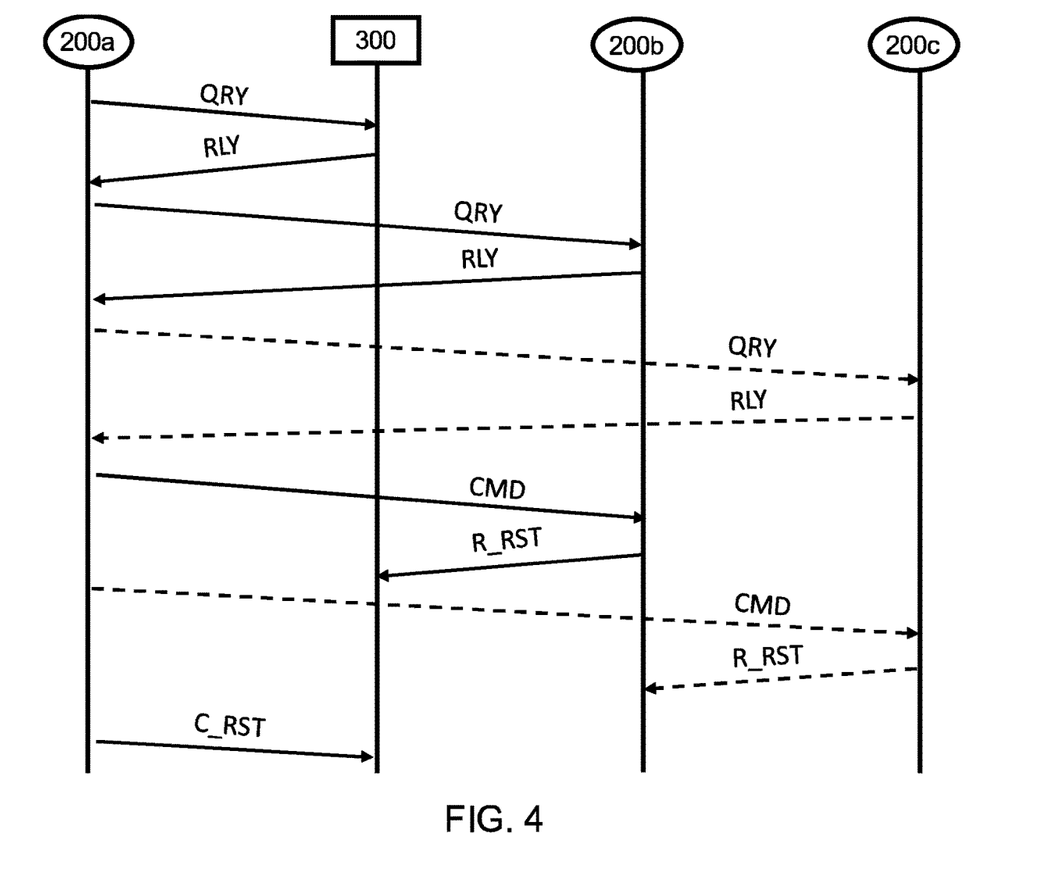
FIG. 4 shows a more advanced message exchange procedure for current negotiation between a control device, a power source, a second control device, and at least one further control device.

A more advanced dialog among the control device 200a, the power source 300 and the second control device 200b for current negotiation is depicted in FIG. 4. Same as shown in FIG. 3, it starts from the control device 200a to first check the available current at the power source 300. And if the power source 300 does not have sufficient current available, the control device 200a calculates a gap between the actual need and the available amount at the power source 300. The control device 200a then seeks for help from the second control device 200b. The control device 200a sends a second query QRY to the second control device 200b regarding its allocated current. Based on the reply RLY from the second control device 200b, the control device 200a knows exactly if the second control device 200b can assist the power source 300 in providing sufficient current by releasing part of or total allocated current of the second control device 200b. Therefore, the chance of an unpredicted reboot of the power source, as result of being requested for an amount of current larger than actual amount available, is further reduced, considering the possibility of the allocated current of the second control device might be lower than the gap.

The same approach of obtaining more current by requesting another control device with a lower hierarchy level to release current can be applied to at least one further control device 200c, 200d. The control device 200a first gets an overview of the allocated current of the second control device 200b and the at least one further control device 200c, 200d, and then it can split the gap among these control devices 200b, 200c, 200d accordingly. As disclosed above, different system optimizations can be considered in implementing the division. And then, if the control device 200a makes sure by requesting these control devices 200b, 200c, 200d to release an amount of current at least equal to a sub-portion of the gap, the power source will have sufficient current available. The control device 200a will then send commands CMD to those control devices 200b, 200c, 200d to instruct them send release request R_RST to the power source 300. Current request C_RST will be sent out by the control device 200a after confirming the previously sent commands CMDs are executed by those devices 200b, 200c, 200d. Hence, control devices 200b, 200c, 200d with lower hierarchy levels support the control device 200a with a higher hierarchy level for obtaining sufficient current in a collective way.

Figure 5:
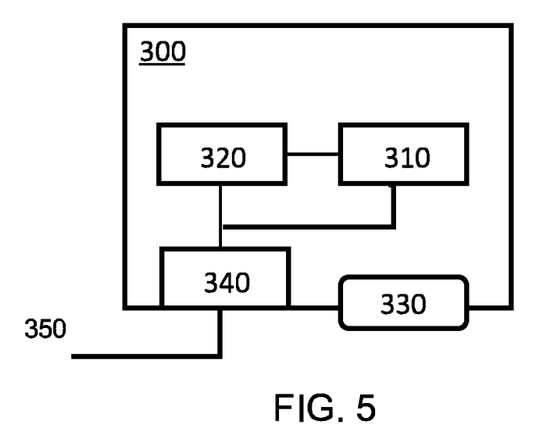
FIG. 5 schematically depicts example components of a power source.

FIG. 5 schematically depicts example components of a power source 300. As a very basic setup, the power source 300 comprises a communication subsystem 310, a controller 320, an interface 330 to connect to the control network, a power management unit 340 connected to the mains 350. The communication subsystem 310 can be a transmitter and receiver pair, or an integrated transceiver. The communication subsystem 310 is configured to monitor the network, and to send a reply RLY upon receipt of a query QRY. The controller 320 is configured to register an amount of available current out of a maximum current of the power source 300; the controller is further configured to allocate or release current upon receipt of a current request or a release request, and to update the amount of available current accordingly. Typically, the power management unit 340 will be configured to convert the mains 350 power, or other power supply, to a control network suitable DC power in order to supply the control network with DC currents. In one example, the mains input voltages may vary in the range of 220V-240V alternating current (AC). For a DALI-SR system, the direct current (DC) bus voltage will be between 12V to 20V depending on the connected device load and the number of SR supplies or power sources put in parallel. It will be appreciated that for actual power sources, the capacity of the power sources will be limited giving rise to the need for power negotiation when the maximum capacity drawn by the control network may exceed the power supply capacity. The power source may also include a volatile memory. Given the different possibilities of the deployment of the power source, either as an integrated power source 300 or as a standalone power source 300', the communication subsystem 310 and the controller 320 may be dedicated to the power source 300' or shared with the device 400 that the power source 300 is coupled with.

Figure 6:
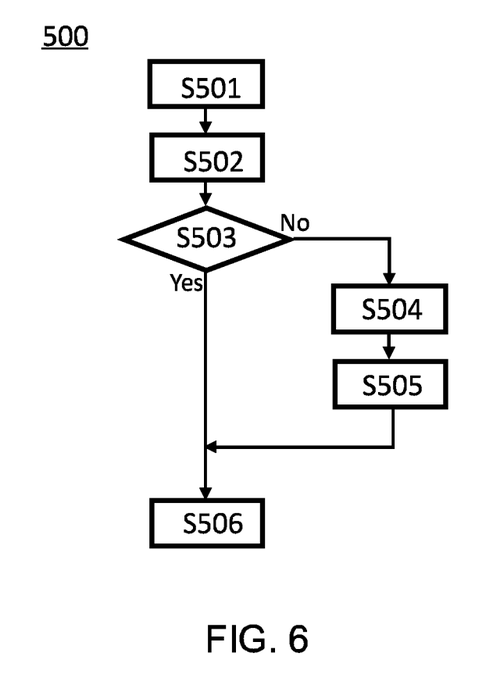
FIG. 6 shows a flow diagram of a method carried out at a control device for obtaining current from a power source and a second control device.

FIG. 6 shows a flow diagram of a method 500 carried out by the control device 200, 200a. In step S501, the control device 200, 200a sends a first query QRY to the power source 300 regarding an amount of available current of the power source. In step S502, the control device receives a reply RLY from the power source about the amount of available current; and then the control device determines, in step S503, if the amount of available current of the power source 300 is sufficient as compared to a required supply current of the control device. In step S506, the control device sends a current request C_RST to the power source 300 for the required supply current, when the amount of available current of the power source 300 is determined to be sufficient; otherwise, in step S504 the control device sends a command CMD to a second control device having a dedicated hierarchy level lower than the control device, instructing the second control device to send a release request R_RST to the power source to release supply current allocated to the second control device. And then the control device follows step S506 after first confirming, in step S505, that the command is executed by the second control device.

Figure 7:
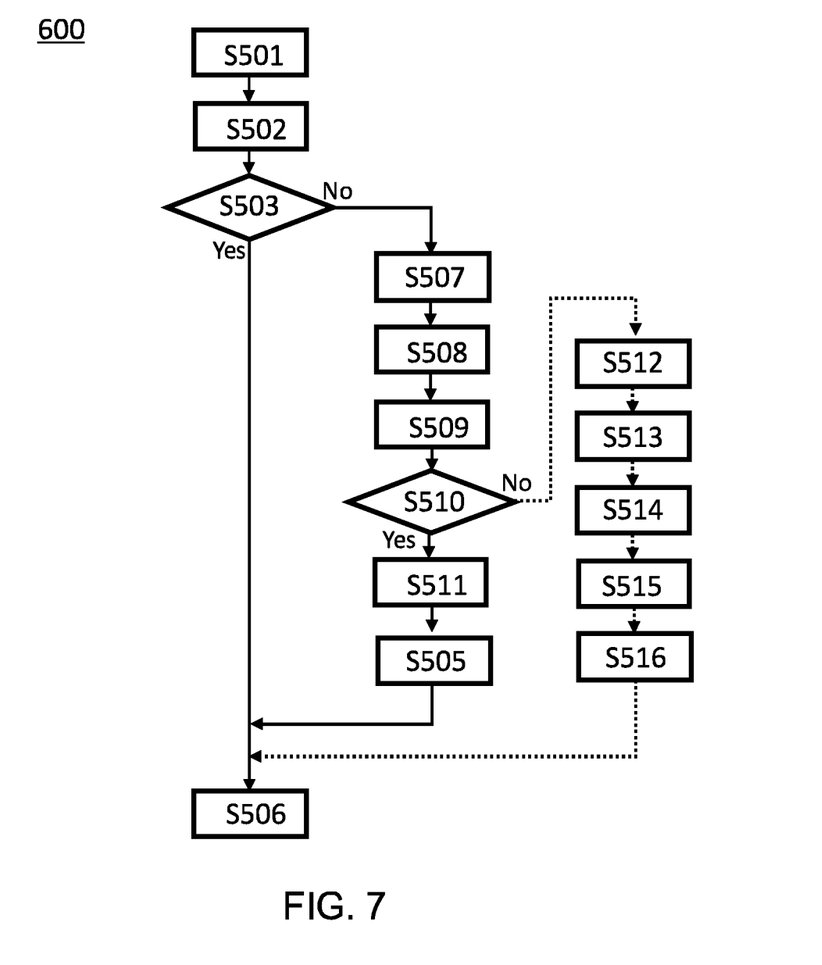
FIG. 7 shows a flow diagram of a more advanced method carried out at a control device for obtaining current from a power source, a second control device, and potentially also from at least one further control device.

FIG. 7 shows a flow diagram of a more advanced method 600 carried out by the control device 200, 200a. Step S504 is replaced by steps S507-S511. In step S507, the control device 200, 200a calculates a gap between the required supply current of the control device and the available current of the power source when the amount of available current of the power source is determined to be insufficient. In step S508, the control device sends a second query QRY to the second control device regarding an amount of supply current from the power source allocated to the second control device, and then in step S509, the control device receives a second reply RLY from the second control device about the amount of its allocated supply current. In step 510, the control device determines if the amount of allocated supply current of the second control device is higher than the gap. And then if the amount of allocated supply current of the second control device is higher than the gap, the control device sends the command CMD, in step S511, to the second control device instructing the second control device to send a release request R_RST to the power source to release an amount of supply current that is not larger than the allocated supply current of the second control device but is at least the same as the gap calculated.

If in step S510 it was determined that the amount of allocated supply current of the second control device is lower than the gap, the control device will carry out the steps S512-S516 before step S506 as shown in FIG. 7. Step S512 is to send at least one further query QRY to at least one further control device with a lower hierarchy level, and step S513 is to receive at least one reply RLY to the query. In step S514, the control device splits the gap into at least two sub-portions when a total amount of supply current allocated to the second control device and to the at least one further control device is higher than the gap. The control device sends commands, in step S515, to the second control device and the at least one further control device instructing them to send release requests R_RST to the power source to release an individual amount of supply current according to the sub-portions split from the gap. Step S506 to send the current request by the control device will be executed after the control device confirms in step S516 that the commands are executed by the second control device and the at least one further control device respectively.

Figure 8:
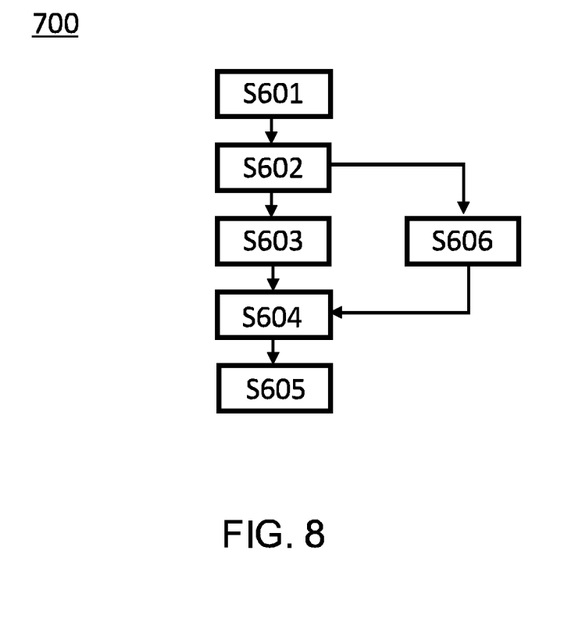
FIG. 8 shows a flow diagram of a method carried out at the second control device or the at least one further device.

FIG. 8 shows a flow diagram of a method 700 carried out at the second control device 200b or the at least one further device 200c, 200d. The second control device and the at least one further device have lower hierarchy levels as compared to the control device 200, 200a, and they monitor the network in step S601 to detect a potential communication and to react to that accordingly. In step 602, the second control device 200b or the at least one further device 200c, 200d receives a query, and then the second control device 200b or the at least one further device 200c, 200d replies in step S603 about its allocated supply current. In step 604, the second control device 200b or the at least one further device 200c, 200d receives a command CMD to release current, and then the second control device 200b or the at least one further device 200c, 200d sends in step S605 release request R_RST to the power source to release the amount of supply current required to release.

It may also be possible that the second control device and the at least one further device are configured to remain active on the network by reserving a minimum amount of current. Then upon receipt of the second or the further query, the second control device and the at least one further device replies in step S606 to the control device about an individual maximum supply current to be released, instead of the actual amount of allocated current.

Figure 9:
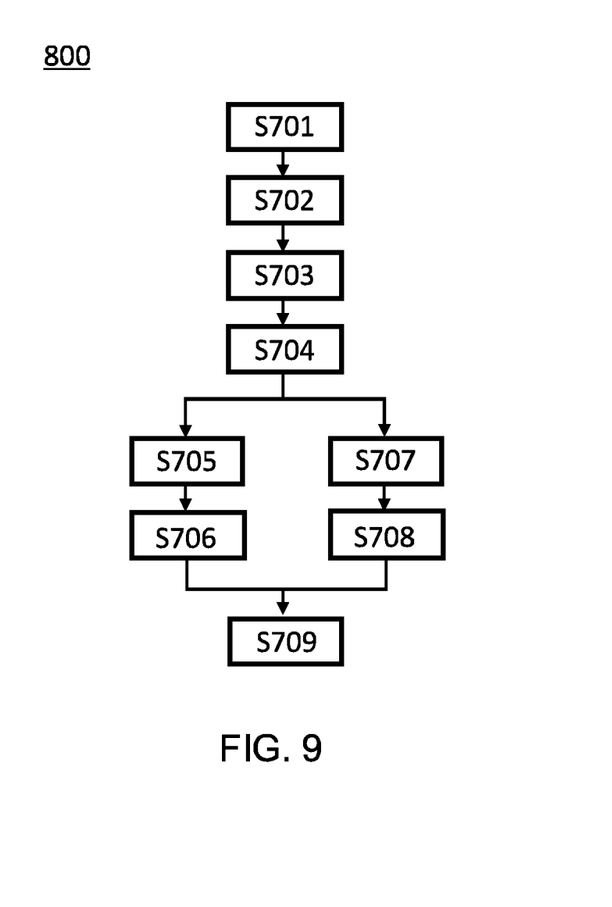
FIG. 9 shows a flow diagram of a method carried out at the power source.

FIG. 9 shows a flow diagram of a method 800 carried out at the power source. The power source is assumed to be a simple device and carries out basic bookkeeping for registering the total current consumption of the active devices on the network. In step S701, the power source monitors the network for potential communication, and registers an amount of available current out of a maximum current in step S702. Upon receipt of a query S703, the power source responses to the query by sending a reply RLY in step S704. Upon receipt of a current request C_RST S705, the power source allocates a requested current in step S706. Upon receipt of a release request R_RST S707, the power source releases a to-be-released current in step S708. And then the power source updates the amount of available current in accordance with allocations and releases in step S709.

The methods according to the invention may be implemented on a computer as a computer implemented method, or in dedicated hardware, or in a combination of both.

Executable code for a method according to the invention may be stored on a machine-readable non-volatile storage medium. Examples of such media include memory devices, optical storage devices, integrated circuits, servers, online software, etc. Preferably, the computer program product comprises non-transitory program code means stored on a computer readable medium for performing a method according to the invention when said program product is executed on a computer.

In a preferred example, the computer program comprises computer program code means adapted to perform the steps of a method according to the invention when the computer program is run on a computer. Preferably, the computer program is embodied on a computer readable medium.

Methods, systems and computer-readable media (transitory and non-transitory) may also be provided to implement selected aspects of the above-described embodiments.

The term "controller" is used herein generally to describe various apparatus relating to, among other functions, the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, compact disks, optical disks, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g. for device control, data storage, data exchange, etc.) between any two or more devices and/or among multiple devices coupled to the network. Furthermore, it should be readily appreciated that various networks of devices as discussed herein may employ one or more wireless, and or wire/cable links to facilitate information transport throughout the network. In a wired version, the network can be arranged in a bus or star topology, or a combination of these. In a wireless version, the network can have a more flexible topology, which can be arranged in a star, a tree, a mesh topology, or a combination of these. For lighting control, DALI is such a network-based system, and originally it is known as a DALI bus, as specified by the technical standards IEC 62386 and IEC 60929. More recently, The indefinite articles "a" and "an," as used herein in the specification and in the claims, unless clearly indicated to the contrary, should be understood to mean "at least one."

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited. Also, reference numerals appearing between parentheses in the claims, if any, are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases.

The invention claimed is:

1. A control device having a dedicated hierarchy level configured to obtain DC current from a power source on the control network, the control device comprising:
    a communication subsystem configured to:
        send a first query over the control network to the power source regarding an amount of available current of the power source;
        receive a reply over the control network from the power source about the amount of available current; and
    a controller configured to determine if the amount of available current of the power source is sufficient as compared to a required supply current of the control device; and
    wherein the communication subsystem is further configured to:
    send a command over the control network to a second control device having a dedicated hierarchy level lower than the control device, instructing the second control device to send a release request to the power source to release supply current allocated to the second control device, when the amount of available current of the power source is determined insufficient; and
    send a current request over the control network to the power source for the required supply current, when the amount of available current of the power source is determined sufficient or after confirming the command is executed by the second control device.

2. The control device of claim 1, wherein the controller is further configured to calculate a gap between the required supply current of the control device and the available current of the power source when the amount of available current of the power source is determined to be insufficient, and the communication subsystem is further configured to:
    send a second query over the control network to the second control device regarding an amount of supply current from the power source allocated to the second control device, before sending the command to the second control device;
    receive a second reply over the control network from the second control device about the amount of its allocated supply current; and
    send the command over the control network to the second control device instructing the second control device to send a release request to the power source to release an amount of supply current that is not larger than the allocated supply current of the second control device but is at least the same as the gap calculated, when the amount of allocated supply current of the second control device is higher than the gap.

3. The control device of claim 2, wherein the communication subsystem is further configured to:
    send at least one further query over the control network to at least one further control device having a dedicated hierarchy level lower than the control device , regarding an amount of supply current allocated to the at least one further control device when the amount of allocated supply current of the second control device is lower than the gap;
    receive at least one reply over the control network from the at least one further control device about the amount of its allocated supply current; and
    the controller is further configured to
    split the gap into at least two sub-portions when a total amount of supply current allocated to the second control device and to the at least one further control device is higher than the gap; and the communication subsystem is further configured to
send commands over the control network to the second control device and the at least one further control device instructing them to send release requests to the power source to release an individual amount of supply current, which is at least the same as one sub-portion of the at least two sub-portions but not larger than the individual allocated supply current of either the second control device or the at least one further control device;
send the current request over the control network to the power source for the required supply current, after confirming the commands are executed by the second control device and the at least one further control device respectively; and
wherein the number of sub-portions is the same as the sum of the second and at least one further control device.

4. The control device of claim 3, wherein the more than one sub-portion is split from the gap calculated according to one of: actual supply currents of the second and the at least one further control device, amounts derived from dedicated hierarchy levels associated with the second and the at least one further control device, an individual maximum supply current to be released by the second and the at least one further control device; and wherein each one of the more than one sub-portion can be of a same or different amount.

5. A control network system comprising at least a control device and a second control device of claim 1.

6. A power source on a control network for supplying DC current to devices on the network, the power source comprises:
a communication subsystem configured to monitor the network; and
a controller configured to register an amount of available current out of a maximum current of the power source;
the communication subsystem is further configured to:
send a reply over the control network with information about the amount of available current at the power source upon receipt of the query;
the controller is further configured to:
allocate a requested current of a current request upon receipt of the current request;
release a to-be released current of a release request upon receipt of the release request, wherein the release request is transmitted by a first control device requested to release current by a second control device; and
update the amount of available current in accordance with allocations and releases.

7. The power source of claim 6, the power source is either:
a standalone bus power supply, or
an integrated power supply coupled to a device on the control network, and, wherein the communication subsystem and the controller act on behalf of the device and the power supply.

8. A method for a control device having a dedicated hierarchy level to obtain DC current from a power source on the control network the method comprising:
sending over the control network a first query to the power source regarding an amount of available current of the power source;
receiving over the control network a reply from the power source about the amount of available current;
determining if the amount of available current of the power source is sufficient as compared to a required supply current of the control device;
sending a command over the control network to a second control device having a dedicated hierarchy level lower than the control device, instructing the second control device to send a release request to the power source to release supply current allocated to the second control device, when the amount of available current of the power source is determined insufficient; and
sending a current request over the control network to the power source for the required supply current, when the amount of available current of the power source is determined sufficient or after confirming the command is executed by the second control device.

9. The method of claim 8, the method further comprising:
calculating a gap between the required supply current of the control device and the available current of the power source when the amount of available current of the power source is determined to be insufficient;
sending a second query over the control network to the second control device regarding an amount of supply current from the power source allocated to the second control device, before sending the command to the second control device;
receiving a second reply over the control network from the second control device about the amount of its allocated supply current; and
sending the command over the control network to the second control device instructing the second control device to send a release request to the power source to release an amount of supply current that is not larger than the allocated supply current of the second control device but is at least the same as the gap calculated, when the amount of allocated supply current of the second control device is higher than the gap.

10. The method of claim 9, when the amount of allocated supply current of the second control device is lower than the gap, the method further comprising:
sending at least one further query over the control network to at least one further control device having a dedicated hierarchy level lower than the control device, regarding an amount of supply current allocated to the at least one further control device when the amount of allocated supply current of the second control device is lower than the gap;
receiving at least one reply over the control network from the at least one further control device about the amount of its allocated supply current;
splitting the gap into at least two sub-portions when a total amount of supply current allocated to the second control device and to the at least one further control device is higher than the gap;
sending commands over the control network to the second control device and the at least one further control device instructing them to send release requests to the power source to release an individual amount of supply current, which is at least the same as one sub-portion of the at least two sub-portions but not larger than the individual allocated supply current of either the second control device or the at least one further control device; and
sending the current request over the control network to the power source for the required supply current, after confirming the commands are executed by the second control device and the at least one further control device respectively; and
wherein the number of sub-portions is the same as the sum of the second and at least one further control device.

11. The method of claim 10, the method further comprising:
  monitoring the network;
  replying over the control network to the control device about its allocated supply current upon receipt of the second or the further query; and
  sending the release request over the control network to the power source to release the amount of supply current required to release upon receipt of the command.

12. The method of claim 11, the method further comprising:
  replying over the control network to the control device about an individual maximum supply current to be released upon receipt of the second or the further query.

13. The method of claim 10, when the total amount of supply current allocated to the second control device and to the at least one further control device is lower than the gap, the method further comprising:
  sending another command over the control network to the power source to force a reboot of the power source.

14. The method of claim 8, the method further comprising:
  monitoring the network;
  registering an amount of available current out of a maximum current of the power source;
  sending a reply over the control network with the information about the amount of available current upon receipt of a first query;
  allocating a requested current of a current request upon receipt of the current request;
  releasing a to-be released current of a release request upon receipt of the release request; and
  updating the amount of available current in accordance with allocations and releases.

15. A non-transitory computer readable medium storing instructions which, when the instructions are executed by a computer, cause the computer to perform the method of claim 8.

* * * * *